United States Patent
Nishikawa et al.

(10) Patent No.: US 11,225,049 B2
(45) Date of Patent: Jan. 18, 2022

(54) LAMINATED MEMBER, LAMINATED BODY, AND MOTOR

(71) Applicant: Panasonic Corporation, Osaka (JP)

(72) Inventors: Yukio Nishikawa, Osaka (JP); Hideaki Hamada, Hyogo (JP); Yohei Hattori, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 301 days.

(21) Appl. No.: 16/325,373

(22) PCT Filed: Feb. 8, 2018

(86) PCT No.: PCT/JP2018/004364
§ 371 (c)(1),
(2) Date: Feb. 13, 2019

(87) PCT Pub. No.: WO2018/155206
PCT Pub. Date: Aug. 30, 2018

(65) Prior Publication Data
US 2019/0202175 A1    Jul. 4, 2019

(30) Foreign Application Priority Data

Feb. 24, 2017 (JP) .............................. JP2017-033100

(51) Int. Cl.
*B32B 15/01* (2006.01)
*H02K 1/18* (2006.01)
(Continued)

(52) U.S. Cl.
CPC .............. *B32B 15/01* (2013.01); *B21D 28/02* (2013.01); *B21D 28/04* (2013.01); *B21D 28/06* (2013.01);
(Continued)

(58) Field of Classification Search
CPC ..... B32B 15/01; B32B 15/011; B32B 15/012; B32B 15/013; B32B 15/015;
(Continued)

(56) References Cited

U.S. PATENT DOCUMENTS 4,783,983 A * 11/1988 Narasimhan ......... B22D 11/126
225/93.5
6,737,784 B2    5/2004 Lindquist et al.
(Continued)

FOREIGN PATENT DOCUMENTS

EP    3238847 A1    11/2017
JP    55-156623    12/1980
(Continued)

OTHER PUBLICATIONS

The Extended European Search Report dated Oct. 22, 2019 for the related European Patent Application No. 18758042.8.
(Continued)

*Primary Examiner* — Michael E. La Villa
(74) *Attorney, Agent, or Firm* — McDermott Will and Emery LLP

(57) ABSTRACT

A laminated member as a laminate of a plurality of alloy ribbons is used. The laminated member has a side surface with a fracture surface. A laminated body as a laminate of the laminated member is used. A motor that includes a core using the laminated body is used. A method for manufacturing a laminated member is used that includes: fixing a plurality of amorphous ribbons to one another in a part of layers of the amorphous ribbons after laminating the amorphous ribbons; and punching a laminated member by cutting the laminate of the amorphous ribbons at a location that excludes the portion fixing the amorphous ribbons in the laminate.

16 Claims, 15 Drawing Sheets

17

(51) Int. Cl.
*H02K 1/17* (2006.01)
*H02K 1/02* (2006.01)
*H01F 41/02* (2006.01)
*B21D 28/02* (2006.01)
*B21D 28/26* (2006.01)
*B21D 35/00* (2006.01)
*H02K 15/02* (2006.01)
*B21D 28/04* (2006.01)
*B21D 28/06* (2006.01)
*B32B 15/20* (2006.01)
*B32B 15/04* (2006.01)
*B32B 15/18* (2006.01)

(52) U.S. Cl.
CPC ............ *B21D 28/26* (2013.01); *B21D 35/00* (2013.01); *B32B 15/011* (2013.01); *B32B 15/012* (2013.01); *B32B 15/013* (2013.01); *B32B 15/015* (2013.01); *B32B 15/016* (2013.01); *B32B 15/017* (2013.01); *B32B 15/018* (2013.01); *B32B 15/04* (2013.01); *B32B 15/043* (2013.01); *B32B 15/18* (2013.01); *B32B 15/20* (2013.01); *H01F 41/024* (2013.01); *H02K 1/02* (2013.01); *H02K 1/17* (2013.01); *H02K 1/18* (2013.01); *H02K 1/185* (2013.01); *H02K 15/022* (2013.01); *C22C 2200/02* (2013.01); *H02K 2213/03* (2013.01); *Y10T 428/1266* (2015.01); *Y10T 428/12188* (2015.01); *Y10T 428/12229* (2015.01); *Y10T 428/12236* (2015.01); *Y10T 428/12264* (2015.01); *Y10T 428/12271* (2015.01); *Y10T 428/12347* (2015.01); *Y10T 428/12361* (2015.01); *Y10T 428/12368* (2015.01); *Y10T 428/12431* (2015.01); *Y10T 428/12438* (2015.01); *Y10T 428/12493* (2015.01); *Y10T 428/12604* (2015.01); *Y10T 428/12611* (2015.01); *Y10T 428/12618* (2015.01); *Y10T 428/12667* (2015.01); *Y10T 428/12993* (2015.01); *Y10T 428/2495* (2015.01); *Y10T 428/24967* (2015.01); *Y10T 428/24975* (2015.01); *Y10T 428/26* (2015.01); *Y10T 428/263* (2015.01); *Y10T 428/264* (2015.01); *Y10T 428/265* (2015.01)

(58) Field of Classification Search
CPC ... B32B 15/016; B32B 15/017; B32B 15/018; B32B 15/04; B32B 15/043; B32B 15/18; B32B 15/20; B21D 28/04; B21D 28/06; B21D 28/02; B21D 28/26; B21D 35/00; H02K 1/185; H02K 1/18; H02K 1/02; H02K 1/17; H02K 15/022; H02K 2213/03; H01F 41/024; C22C 2200/02; Y10T 428/12188; Y10T 428/12229; Y10T 428/12236; Y10T 428/12264; Y10T 428/12271; Y10T 428/12347; Y10T 428/12361; Y10T 428/12368; Y10T 428/12604; Y10T 428/12611; Y10T 428/12618; Y10T 428/1266; Y10T 428/12667; Y10T 428/12993; Y10T 428/12493; Y10T 428/12431; Y10T 428/12438; Y10T 428/2495; Y10T 428/24967; Y10T 428/24975; Y10T 428/26; Y10T 428/263; Y10T 428/264; Y10T 428/265
See application file for complete search history.

(56) References Cited

U.S. PATENT DOCUMENTS

| | | | |
|---|---|---|---|
| 2013/0278103 | A1 | 10/2013 | McPherson et al. |
| 2015/0256036 | A1 | 9/2015 | Nakamura |
| 2017/0368590 | A1* | 12/2017 | Senda .................. B21D 28/14 |

FOREIGN PATENT DOCUMENTS

| | | |
|---|---|---|
| JP | 3-079215 | 4/1991 |
| JP | 9-192919 | 7/1997 |
| JP | 2003-153503 | 5/2003 |
| JP | 2003-304654 A | 10/2003 |
| JP | 2008-213410 | 9/2008 |
| JP | 2008-262944 | 10/2008 |
| JP | 2012-050989 A | 3/2012 |
| JP | 2013-546301 | 12/2013 |
| JP | 2015-136712 | 7/2015 |
| JP | 2015-171288 | 9/2015 |
| JP | 2016-082814 A | 5/2016 |
| JP | 2016-123976 A | 7/2016 |
| WO | 2016/104686 A1 | 6/2016 |
| WO | WO 2016/104686 * | 6/2016 |

OTHER PUBLICATIONS

International Search Report of PCT application No. PCT/JP2018/004364 dated Apr. 24, 2018.
English Translation of Chinese Search Report dated Sep. 18, 2020 for the related Chinese Patent Application No. 201880003265.3.
English Translation of Chinese Search Report dated Mar. 3, 2021 for the related Chinese Patent Application No. 201880003265.3.
Zhou Juanli,"Influence Analysis of Die Clearance to the Quality of Blanking Parts", China Metalforming Equipment and Manufacturing Technology, vol. 51, issue 4, p. 113-115, Aug. 31, 2016(Aug. 31, 2016).
"Selected Collection of Chinese Machinery Manufacturing Technology and Equipment Mould Industry", China Mould Industry Association, p. 270, Mar. 31, 2001(Mar. 31, 2001).

* cited by examiner

LAMINATED MEMBER, LAMINATED BODY, AND MOTOR

CROSS-REFERENCE TO RELATED APPLICATIONS

This application is a U.S. national stage application of the PCT International Application No. PCT/JP2018/004364 filed on Feb. 8, 2018, which claims the benefit of foreign priority of Japanese patent application 2017-033100 filed on Feb. 24, 2017, the contents all of which are incorporated herein by reference.

TECHNICAL FIELD

The technical field relates to a laminated member using a plurality of alloy ribbons, a method for manufacturing same, a laminated body using the laminated member, and a motor using the laminated body as a stator.

BACKGROUND

An electromagnetic steel plate is a mainstream of a laminated body using magnetic material. However, there has been increasing use of laminated bodies using amorphous alloy ribbons, and alloy ribbons having nanocrystal grains. These alloy ribbons are thinner than the electromagnetic steel plate by one order of magnitude. For manufacture of a laminated member or a laminated body using such thin ribbons, a laminated body of amorphous ribbons needs to be accurately cut into predetermined dimensions with high productivity.

FIG. 14 is a schematic side view representing a traditional method of manufacture of a laminated member described in JP-A-H03-79215. The diagram shows positions of an upper blade 61, a lower blade 62, and a laminate of amorphous ribbons 63. The appropriate clearance against a single sheet of amorphous ribbon 63 having a thickness of 25 µm is 4 µm or less, and 3 µm in this example. At room temperature, the upper blade 61 is lowered at a rate of 0.2 m/s or more to cut the laminate.

FIG. 15 is a schematic perspective view representing a traditional method of manufacture of laminated body 71 described in JP-A-2008-213410. The layers of soft magnetic metal ribbons 72 are bonded to each other over the whole surface with a thermosetting resin 73 to form a laminated body 71, and the laminated body 71 is punched.

However, in the traditional method shown in FIG. 14 representing the laminated member manufacturing method described in JP-A-H03-79215, the layers of amorphous ribbons 63 are not fixed to each other, and slide against each other in parallel direction during work, particularly in lower layers. These layers are dragged downwardly into a die, and cracking and chipping occur in the amorphous ribbon.

In the traditional method shown in FIG. 15 representing the laminated body manufacturing method described in JP-A-2008-213410, the presence of the thermosetting resin 73 bonding the layers of soft magnetic metal ribbons 72 results in the amorphous ribbons having a smaller space factor in laminate direction. This impairs magnetic characteristics.

SUMMARY

The present disclosure is intended to find a solution to the foregoing problems of the related art, and an object of the present disclosure is to provide a laminated member that does not involve shape defects such as cracking and chipping in the ribbons, or deterioration of its characteristics. The present disclosure is also intended to provide a method for manufacturing such a laminated member. A laminated body, and a motor using same are also provided.

According to an aspect of the disclosure, a laminated member is used that includes a laminate of a plurality of alloy ribbons, the laminate member having a side surface with a fracture surface.

According an aspect of the disclosure, a laminated body as a laminate of the laminated member is used.

According an aspect of the disclosure, a motor is used that has a core for which the laminated body is used.

According an aspect of the disclosure, a method for manufacturing a laminated member is used that includes:

fixing a plurality of amorphous ribbons to one another in apart of layers of the amorphous ribbons after laminating the amorphous ribbons; and punching a laminated member by cutting the laminate of the amorphous ribbons at a location that excludes the portion fixing the amorphous ribbons in the laminate.

With the configurations of the aspects of the disclosure, the layers of amorphous ribbons in the laminate do not slide against one another when being shaped, and the shape does not suffer from poor accuracy due to defects such as cracking and chipping. Further, because an adhesive or the like is absent between layers, the space factor of the amorphous ribbons does not decrease, and the amorphous ribbons can be worked to produce a laminated member with desirable dimensional accuracy, without impairing the characteristics.

With the laminated member, the method of manufacture thereof, the laminated body, and the motor of the aspects of the present disclosure, the productivity of work can improve without causing shape defects such as cracking and chipping in the ribbons of the laminated member, or without impairing the characteristics, and a motor using the laminated member can have improved motor characteristics.

DESCRIPTION OF EMBODIMENTS

Embodiments of the present disclosure are described below, with reference to the accompanying drawings. It is to be noted that the embodiments serve solely to illustrate the disclosure, and the disclosure is not limited by the content of the following descriptions.

First Embodiment

Manufacture of Laminated Member 15
(1) Fixing Step

Figure 1A:
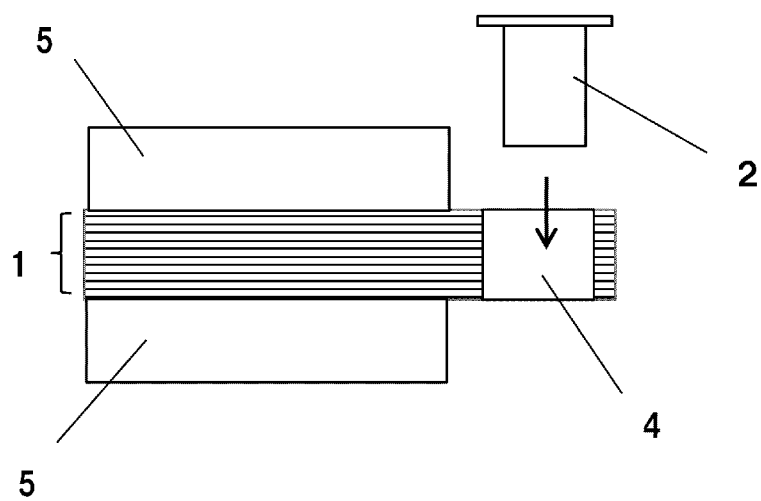
FIG. 1A is across sectional view representing a step in a method for laminating and fixing amorphous ribbons of First Embodiment of the present disclosure.
Figure 1B:
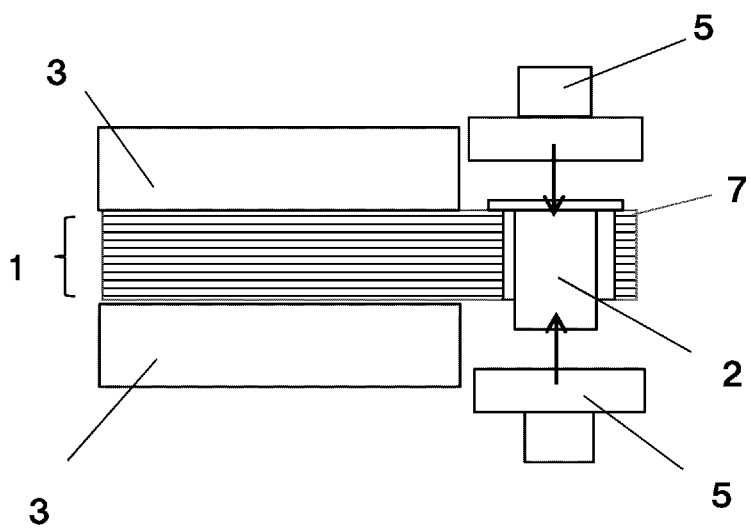
FIG. 1B is a cross sectional view representing a step in the method for laminating and fixing amorphous ribbons of First Embodiment of the present disclosure.
Figure 1C:
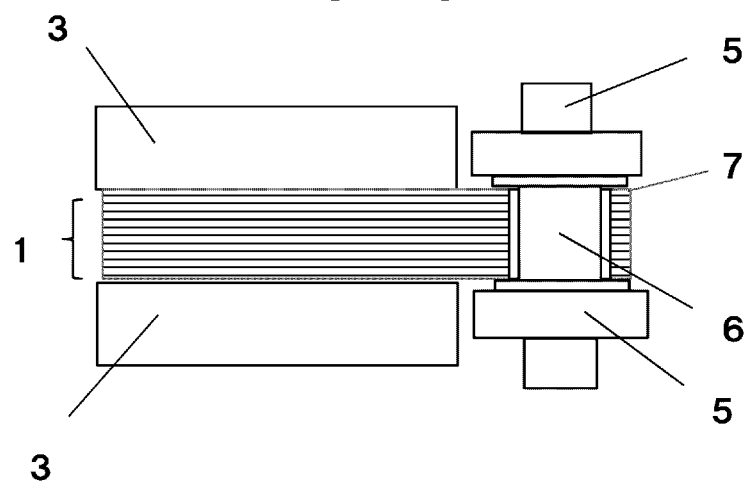
FIG. 1C is a cross sectional view representing a step in the method for laminating and fixing amorphous ribbons of First Embodiment of the present disclosure.

FIGS. 1A to 1C are cross sectional views schematically representing a method for laminating and fixing amorphous ribbons 7 of First Embodiment of the present disclosure. Specifically, the figures show a method that uses a swage structure as a metal fastening mechanism.

Here, swaging is a method by which a riveting material 2 is inserted into a hole 4 provided through a group of amorphous ribbons (hereinafter, "amorphous ribbon group") 1, and the amorphous ribbon group 1 is fixed by expending the riveting material 2 at both ends over the hole 4. A goal of this process is to fix the laminate of amorphous ribbons 7 at one time.

FIGS. 1A to 1C show the amorphous ribbon group 1 as a laminate of amorphous ribbons 7, along with the riveting material 2, a pressing mechanism 3 that holds the amorphous ribbon group 1 from above and below, and the hole 4 in which the riveting material 2 is inserted.

The amorphous ribbon 7 constituting the amorphous ribbon group 1 is sheet of iron-base alloy measuring 10 µm to 60 µm in thickness. The amorphous ribbon 7 is produced by pouring a molten iron-base alloy on a surface of a rotating cooling drum, and spreading the molten alloy into a form of a ribbon before quenching. The amorphous ribbon 7, which is an amorphous magnetic body, improves its magnetic characteristics when crystallized by heat treatment.

Referring to FIG. 1A, the riveting material 2 is inserted into the hole 4 of the amorphous ribbon group 1 in a direction of the arrow.

Referring to FIG. 1B, the amorphous ribbon group 1 is fixed with the pressing mechanism 3, and the inserted riveting material 2 is compressed with a compression mechanism 5 in directions of the arrows.

The riveting material 2 becomes a metal fastening part 6 having upper and lower collars, as shown in FIG. 1C.

With the metal fastening part 6, the amorphous ribbons 7 constituting the amorphous ribbon group 1 can be tightly fixed. Compression may be accomplished by regulating height, whereby the swage height is held constant, or by regulating pressure, whereby the swage pressure is held constant.

The metal fastening mechanism may be a rimmed hole, or a grommet or an eyelet as it is commonly called.

Figure 2A:
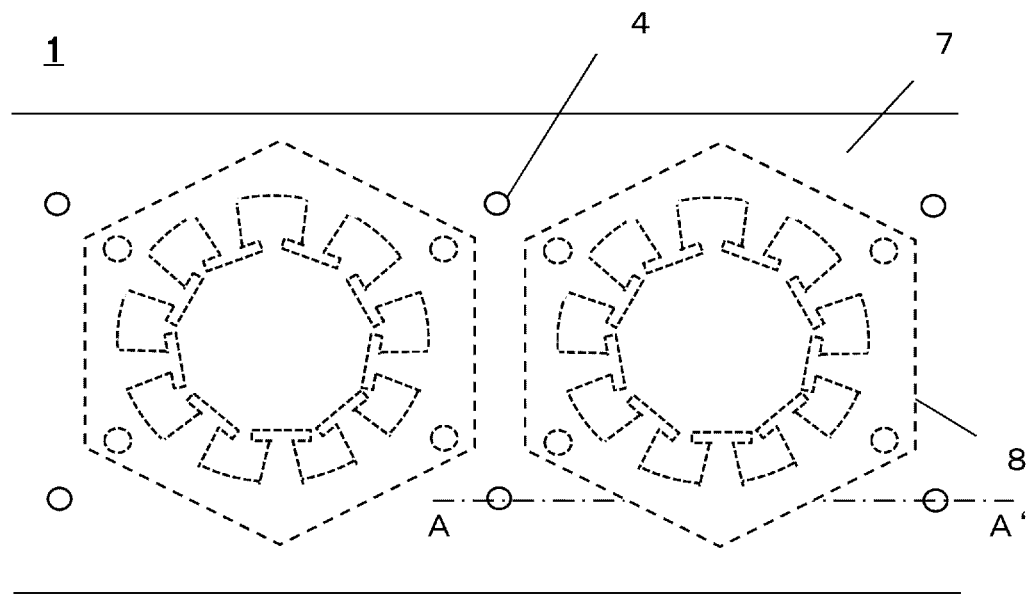
FIG. 2A is a top view representing a method for manufacturing a laminated member of First Embodiment of the present disclosure.
Figure 2B:
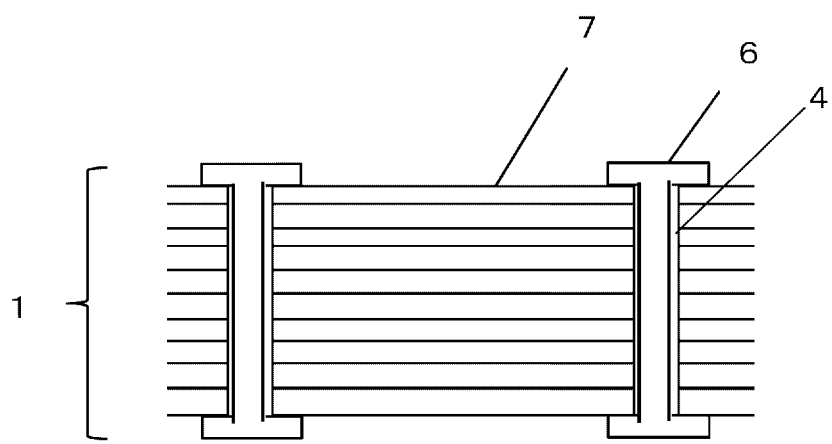
FIG. 2B is a cross sectional view at A-A' of FIG. 2A.

FIGS. 2A and 2B show how the amorphous ribbon group 1 is fixed in the manner described above. FIG. 2A is a top view of the amorphous ribbon group 1. FIG. 2B is a cross sectional view at A-A' of FIG. 2A.

In FIG. 2A, the amorphous ribbon group 1 as a laminate of amorphous ribbons 7 is fixed with the metal fastening part 6 in laminate direction. FIG. 2A shows a layout area 8 that becomes a laminated member 15 after work. The holes 4 where the metal fastening part 6 is inserted are outside of the layout area 8 that becomes the laminated member 15.

The material of the metal fastening part 6 is not particularly limited. The metal fastening part 6 may be iron based. It is, however, preferable to use non-ferrous metals, for example, copper or aluminum, because non-ferrous metals are easy to work, and can provide the necessary strength.

Figure 3A:
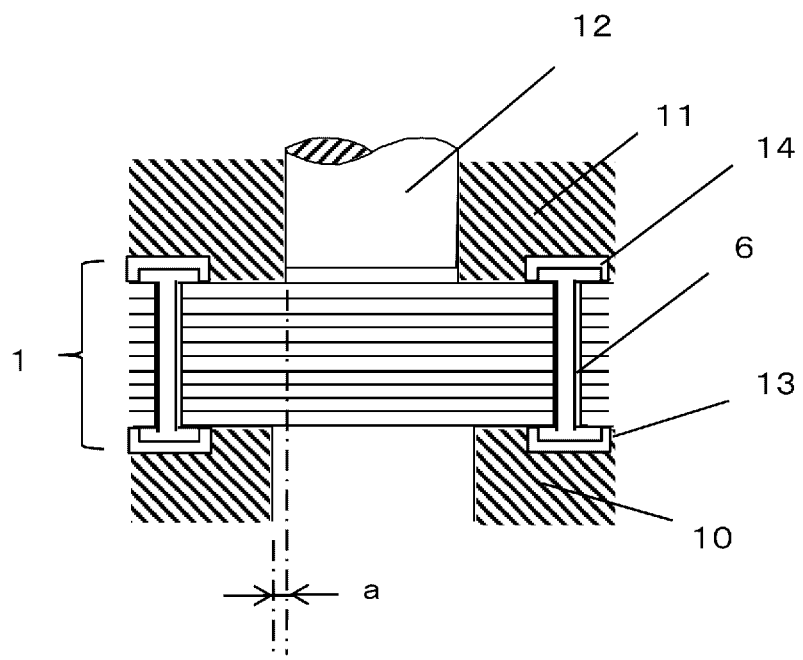
FIG. 3A is a schematic cross sectional view before punching of a work piece in First Embodiment of the present disclosure.
Figure 3B:
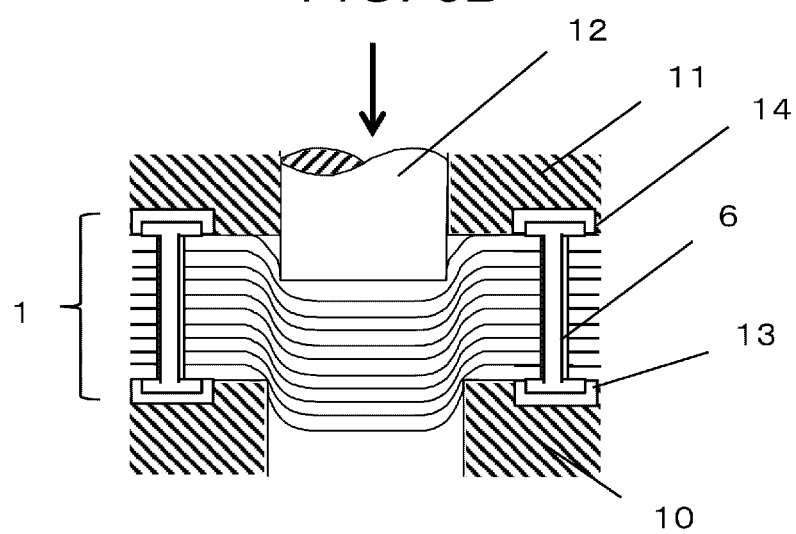
FIG. 3B is across sectional view of the work piece being punched after FIG. 3A.

As can be seen in FIG. 2B, the laminate of amorphous ribbons 7 is swaged with the metal fastening part 6.
(2) Punching Step FIGS. 3A and 3B are cross sectional view schematically representing the steps where the amorphous ribbon group 1 as a laminate of amorphous ribbons 7 is punched to produce the laminated member 15. The schematic cross sectional view of FIG. 3A shows a state before punching. FIG. 3B shows a state during punching.

Referring to FIG. 3A, the amorphous ribbon group 1 is disposed on a die 10. With a pressure board 11 fixing the amorphous ribbon group 1, a punch 12 is disposed on the top surface of the amorphous ribbon group 1. Because the metal fastening part 6 has protruding upper and lower collars, clearance holes 13 and 14 are provided for the die 10 and the pressure board 11, respectively, and the amorphous ribbon group 1 is disposed in such a way that the collars of the metal fastening part 6 are in the clearance holes 13 and 14. In keeping with the basics of punching in press work, the punch 12 and the die 10 have a clearance a that is 5 to 10% of the thickness of the amorphous ribbons 7. Because the amorphous ribbons 7 have a thickness of 10 to 60 µm, the clearance a is at most 6 µm.

However, in the embodiment, the clearance a is at most 9 µm because lamination requires a larger clearance a to accommodate errors in the accuracy of work and assembly.

Punching was difficult to achieve with a clearance a of 9 μm or more. For productivity, at least two layers of amorphous ribbons 7 are laminated. The maximum number of layers that permitted punching without causing shape defects was 25.

Referring to FIG. 3B, the punch 12 is lowered in a direction of arrow at a maximum punching speed of 0.25 m/s. As the punch 12 advances downward, the amorphous ribbon group 1 fixed by the die 10 and the pressure board 11 deforms downwardly as shown in FIG. 3B. The layers in the amorphous ribbon group 1 are fixed with the metal fastening part 6 as shown in FIG. 2B, and do not slide against each other. There accordingly will be no dragging of layers in downward direction.

That is, the amorphous ribbons 7 experience only shear and tensile deformation, and are cut when the amount of deformation exceeds its limit. The metal fastening part 6 fixes the amorphous ribbons 7 in positions different from the portions cut by punching. Materials other than the amorphous ribbons 7 should not be punched with the amorphous ribbons 7 because it not only introduces structural instability in the fixing provided by the die 10 and the pressure board 11, but shortens the life of the punch 12 as a result of an irregular force exerted by deformation of the composite material. The laminated member 15 shown in FIGS. 4A and 4B are produced after the steps described above.

Laminated Member 15

Figure 4A:
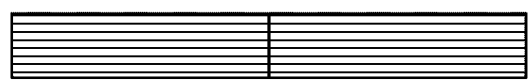
FIG. 4A is aside view of a laminated member of First Embodiment of the present disclosure.
Figure 4B:
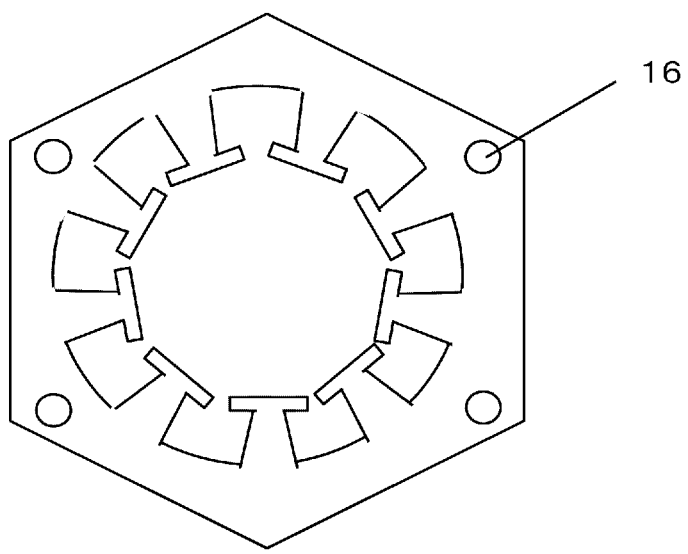
FIG. 4B is a top view of FIG. 4A.

FIGS. 4A and 4B are schematic views of the laminated member 15 obtained after cutting the amorphous ribbon group 1. FIG. 4A is a side view. FIG. 4B is a top view. As shown in FIG. 4B, the laminated member 15 has bolt fastener holes 16. The bolt fastener holes 16 are holes in which bolts for fixing a laminate of laminated members 15 are inserted. The bolt fastener holes 16 are formed in the laminated member 15 during work.

Figure 5A:
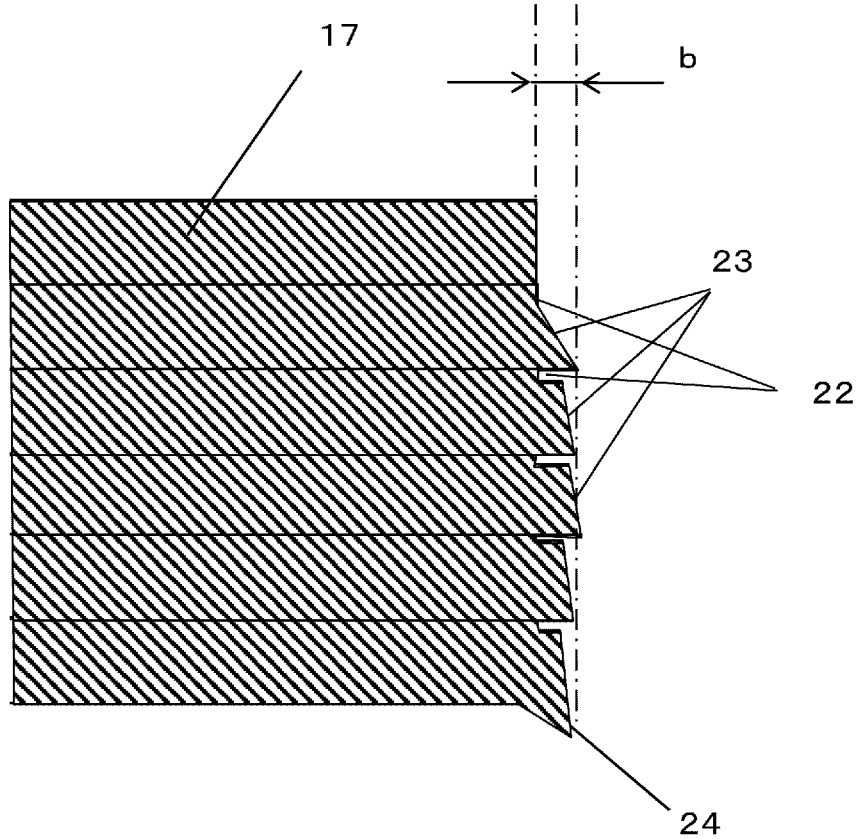
FIG. 5A is across sectional view in the vicinity of a cut portion of the laminated member of First Embodiment of the present disclosure.
Figure 5B:
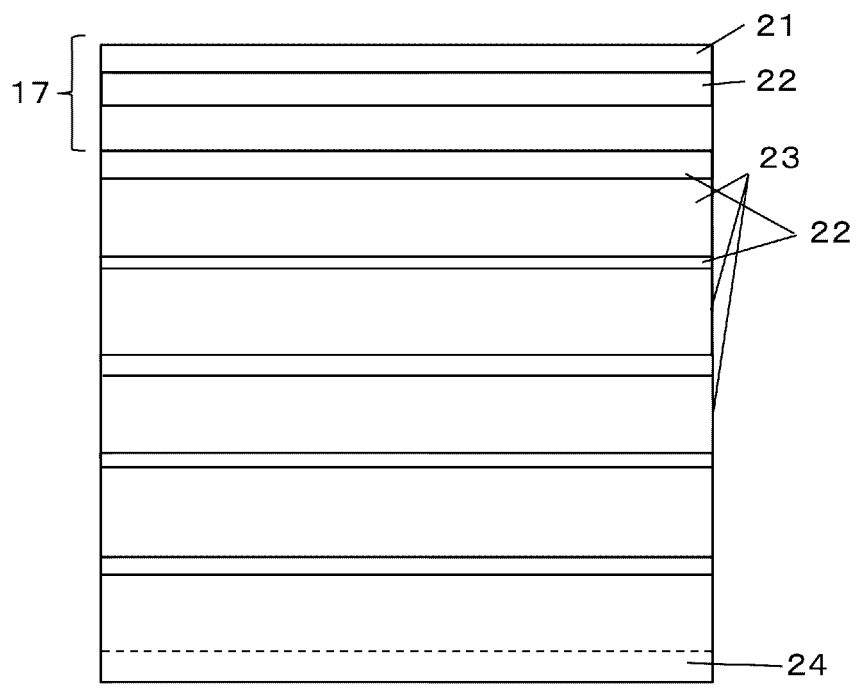
FIG. 5B is an elevational view of FIG. 5A.

FIGS. 5A and 5B are schematic views showing a cut portion of the laminated member 15 shown in FIGS. 4A and 4B. FIG. 5A is a cross sectional view. FIG. 5B is an elevational view.

Figure 6A:
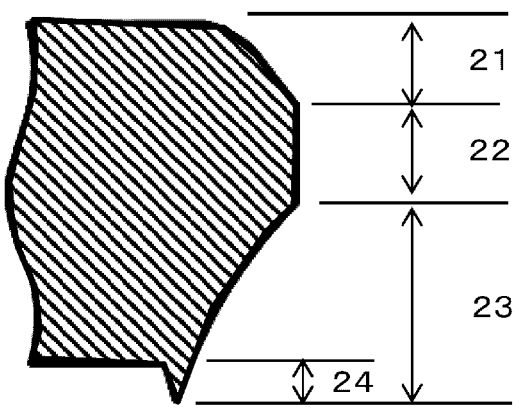
FIG. 6A is a cross sectional view showing a form of the fracture in a cut surface in the uppermost layer of the amorphous ribbons of FIGS. 5A and 5B according to First Embodiment of the present disclosure.
Figure 6B:
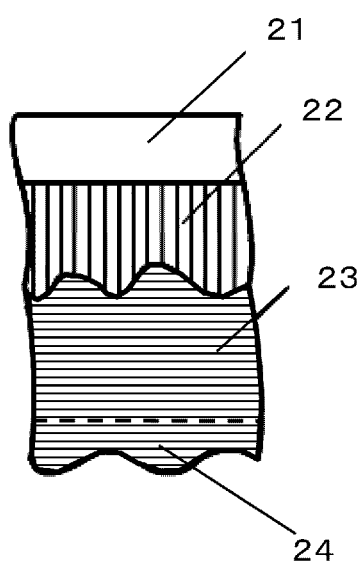
FIG. 6B is an elevational view of FIG. 6A.

FIGS. 6A and 6B are magnified schematic views showing a form of the fracture in a cut surface in the uppermost layer of the amorphous ribbons 17 shown in FIGS. 5A and 5 B. FIG. 6A is a cross sectional view. FIG. 6B is an elevational view.

The cut surface has four different forms: a rollover 21, a shear surface 22, a fracture surface 23, and a burr 24, from the top. With regard to the characteristics of these shapes, the rollover 21 is a gently curved raised portion, the shear surface 22 has a shape with a burnish and vertical streaks, the fracture surface 23 is of a shape that occurs after material is torn off, or a surface with different levels of irregularities, and the burr 24 is a portion of the fracture surface 23 protruding downward, and that appears edgy as viewed in plan. Setting the proportions aside, these four different forms are similar to shapes commonly observed in punching of a sheet material with a press.

In JP-A-H03-79215, the laminate is cut by shearing. As such, the cut surface at least does not show the fracture surface 23, which is a surface that occurs after material is torn off or ripped down as a result of tensile fracture.

The rollover 21 and the shear surface 22 occur in the uppermost layer 17 of amorphous ribbons where the tool makes the first cut.

However, the proportion of the shear surface 22 decreases, and the fracture surface 23 increases its proportion toward the lower layers of the amorphous ribbons 7 as a result of punching, as shown in FIGS. 5A and 5B. The fracture surface 23 occurs in most of the layers in the lower half of the laminate of the amorphous ribbons 7. The burr 24 occurs at the bottom of the fracture surface 23, as mentioned above. By appropriately setting cutting conditions that include clearance b, and the force applied by the pressure board 11 for fixing, the burr 24 pushes itself against the adjoining lower layer, and joins the amorphous ribbons 7.

The burr 24 becomes larger, and more strongly joins the upper and lower amorphous ribbons 7 as the proportion of the fracture surface 23 increases. The laminated member 15 obtained in this fashion may be treated as a one-piece unit, without separately providing interlayer bonding. Because there is no gap between the layers of amorphous ribbons 7, entry of foreign objects between layers can be prevented.

The maximum value of the clearance b for the irregularities on the cut surface shown in FIG. 5A is determined by the inner clearance of a die. In this example, the clearance b in FIG. 5A is at most 9 μm.

When the cut surface has large irregularities, the cut surface may be smoothed by being coated with a material such as resin, and, in this case, the resin can strongly fuse together by the anchoring effect provided by the irregularities.

Lamination of Laminated Member 15

Figure 7A:
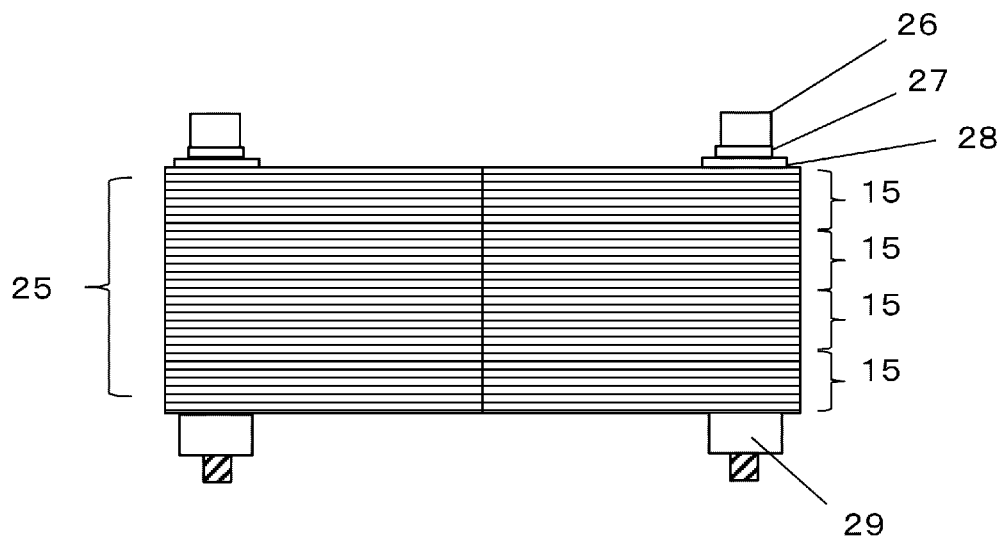
FIG. 7A is a side view of a laminated body of First Embodiment of the present disclosure.
Figure 7B:
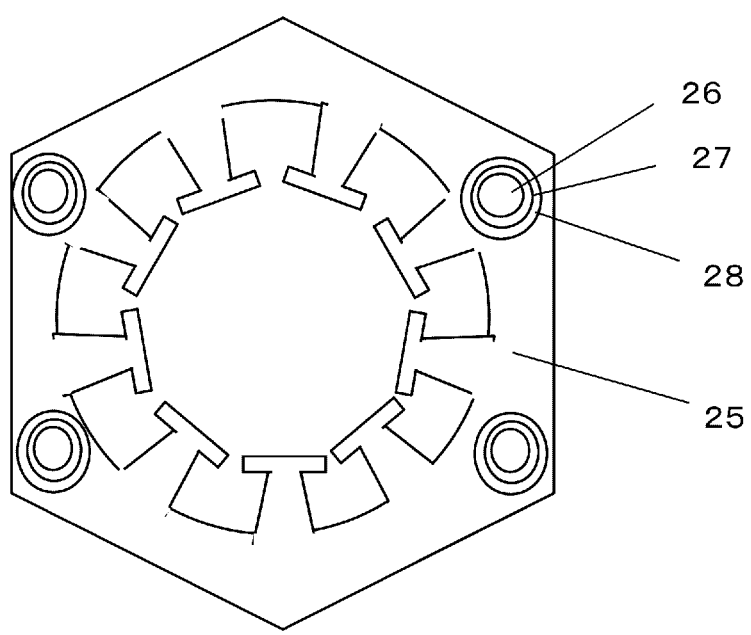
FIG. 7B is a top view of FIG. 7A.

FIGS. 7A and 7B are a side view and a top view, respectively, of a laminated body 25 obtained after laminating a plurality of laminated members 15.

The laminated body 25 is fastened with bolts 26 inserted into the bolt fastener holes 16, and secured with nuts 29 via spring washers 27 and washers 28. In this example, the laminated body 25 is fixed at four locations. There is a limit to the number of amorphous ribbons 7 that can be laminated for punching. However, such limits can be overcome by laminating a plurality of laminated members 15.

As described with reference to FIGS. 5A and 5B, the cut surface of the laminated member 15 has irregularities. However, various phenomena due to the irregularities along the height of the laminate can average out when the laminated members 15 are laminated, and have a periodically occurring irregular shape.

Because the laminated member 15 is a laminate of amorphous ribbons 7, the laminated member 15 crystallizes, and shows improved magnetic characteristics when subjected to an appropriate heat treatment. However, the amorphous ribbons 7 become brittle when subjected to heat treatment, and must be worked into a predetermined shape before heat treatment. The laminated member 15 as a laminated body of amorphous ribbons 7 may be subjected to heat treatment, and laminated before being fastened with the bolts 26 as shown in FIGS. 7A and 7B.

Alternatively, the laminated member 15 as a laminated body of amorphous ribbons 7 may be laminated, and subjected to heat treatment after being fastened with the bolts 26. When subjected to a heat treatment, the laminated member 15 forms an oxide, colored and visible, at least on end surfaces.

Specifically, when subjected to a heat treatment, the amorphous ribbons 7 generate sub-micrometer fine crystal grains of pure iron called nanocrystal grains. This greatly improves the soft magnetic characteristics, and the motor characteristics improve. Because the laminated body 25 is a laminate of a plurality of laminated members 15, the pattern shown in the cross sections of FIGS. 5A and 5B periodically occurs on the end surfaces of the laminate in laminate direction, regardless of the presence or absence of a heat treatment.

A heat treatment forms an oxide film between burrs 24 and fracture surfaces 23 in the contacting layers of the amorphous ribbons 7 and the laminated members 15. The oxide film joins the layers of amorphous ribbons 7 and laminated members 15 to one another, and provides a strongly laminated state. Because the bond is made via the oxide film, insulation can be maintained between layers, and an efficiency drop such as eddy-current losses can be prevented when the laminate is used for motors.

Motor

Figure 8A:
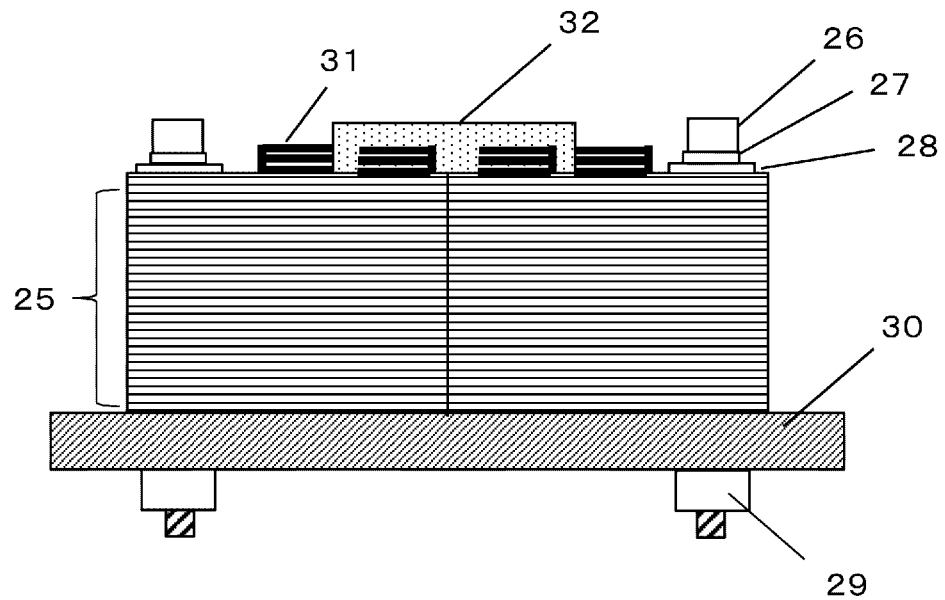
FIG. 8A is a side view of a motor of First Embodiment of the present disclosure.
Figure 8B:
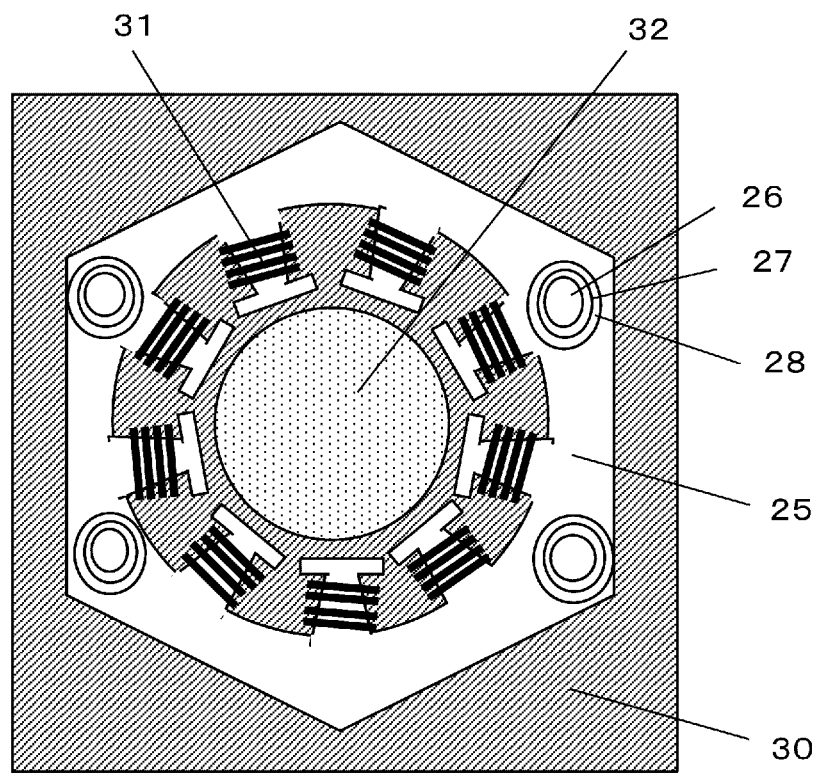
FIG. 8B is a top view of FIG. 8A.

FIGS. 8A and 8B are diagrams showing a motor using the laminated body 25. FIG. 8A shows a side view of the motor. FIG. 8B shows a top view of the motor. After removing the nuts 29 from the state shown in FIGS. 7A and 7B, the laminated body 25 is refastened with the nuts 29 after inserting a metal table 30 underneath the laminated body 25. Thereafter, a stator is formed by installing a coil 31 on the laminated body 25, using the teeth projecting toward the inner diameter side of the laminated member 15. A rotor 32 is then installed in an inner diameter portion of the laminated body 25. Energizing the coil 31 in this state drives the motor.

Effects

As described in the First Embodiment above, the amorphous ribbons 7 are punched after being laminated and fixed. This improves the productivity of the punching step while maintaining accuracy with the die clearance that regulates the height of irregularities on the end surfaces.

Further, because the end surfaces are joined together, the product can be treated as a one-piece unit, and the post processes can be carried out with improved productivity.

Second Embodiment

Figure 9A:
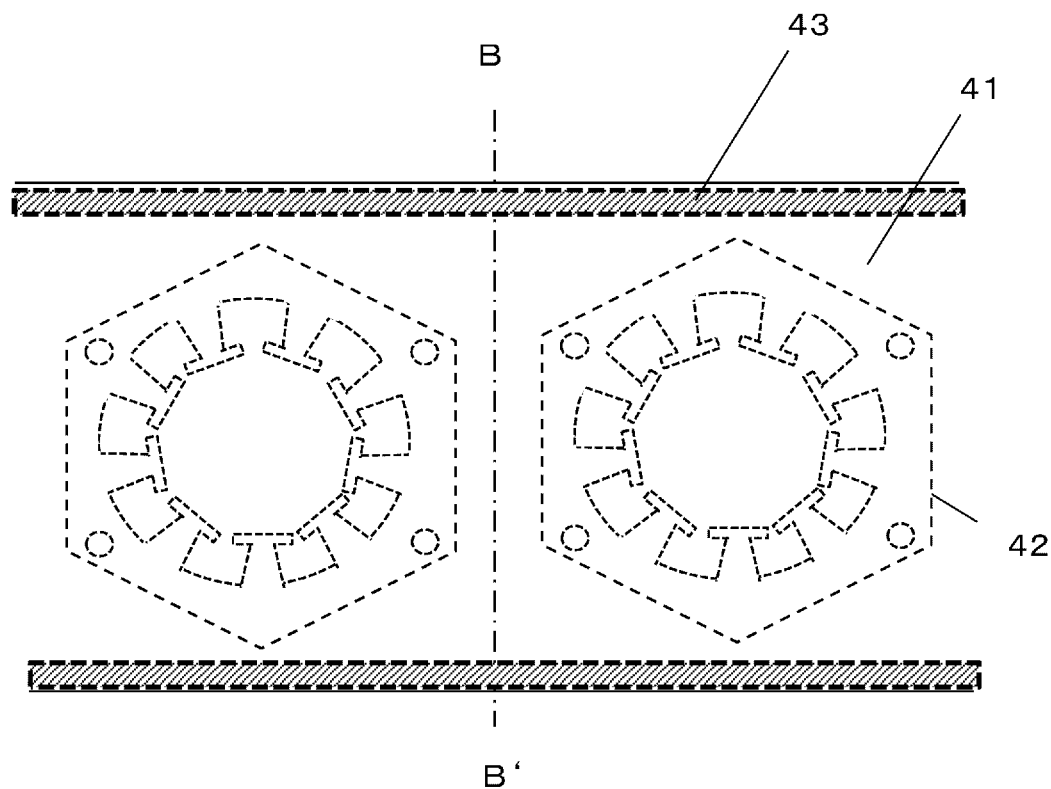
FIG. 9A is a top view schematically showing amorphous ribbons in conjunction with a method for manufacturing a laminated member according to Second Embodiment of the present disclosure.
Figure 9B:
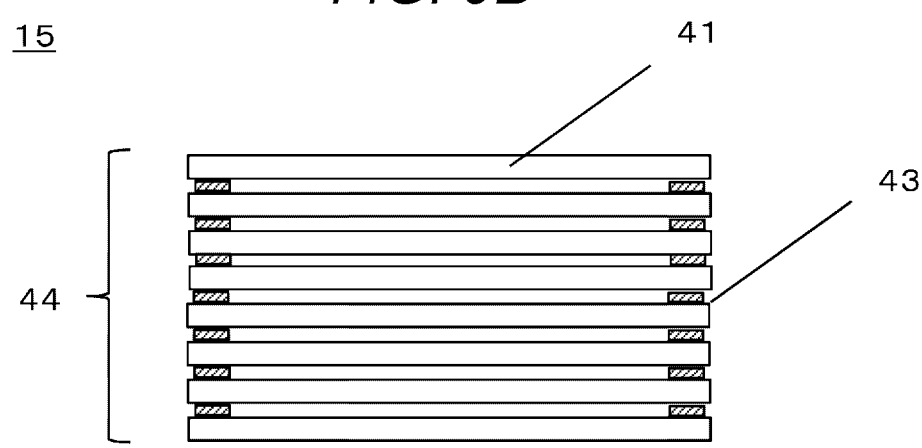
FIG. 9B is a cross sectional view at B-B' of FIG. 9A.

FIGS. 9A and 9B are schematic views representing a method for manufacturing a laminated member 15 of Second Embodiment of the present disclosure. FIG. 9A shows a top view of amorphous ribbons 41. FIG. 9B shows a cross sectional view at B-B' of FIG. 9A. Anything that is not described is the same as in First Embodiment.

FIGS. 9A and 9B differ from First Embodiment in that an adhesive 43 is applied to the amorphous ribbons 41 in portions in the vicinity of the side surfaces of the amorphous ribbons 41, excluding a layout area 42—an area where the laminated member 15 is to be punched. After application, the amorphous ribbons 41 are laminated, and dried and fixed to obtain a work piece 44.

By applying the adhesive 43, it is not required to provide the fixing holes 4 (see FIG. 1A and elsewhere) in the amorphous ribbons 41 in advance. Other advantages include fewer numbers of steps, and ease of changing the fixing position.

The adhesive 43 is applied in substantially a straight line near the side surfaces, and accordingly only the width direction needs to be taken into consideration in positioning the layout area 42 to be punched, allowing the layout area 42 to be more freely positioned in longitudinal direction, and making the production easier.

This is followed by the punching step described above in (2).

Third Embodiment

Figure 10A:
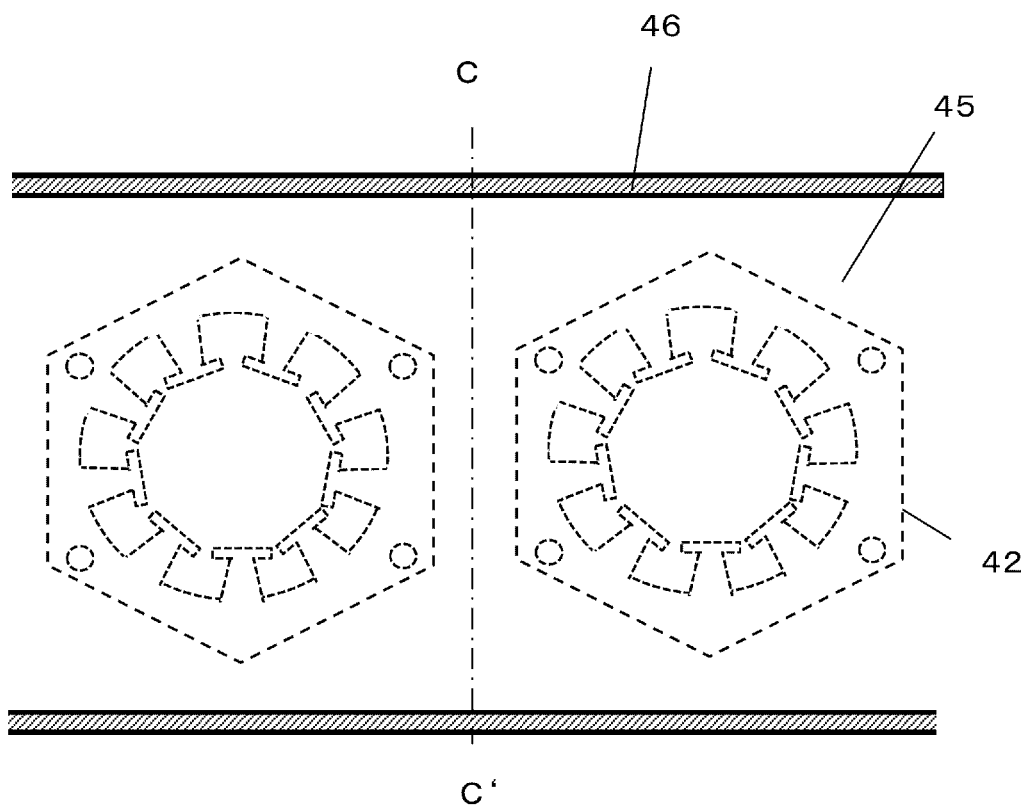
FIG. 10A is a top view schematically showing amorphous ribbons in conjunction with a method for manufacturing a laminated member according to Third Embodiment of the present disclosure.
Figure 10B:
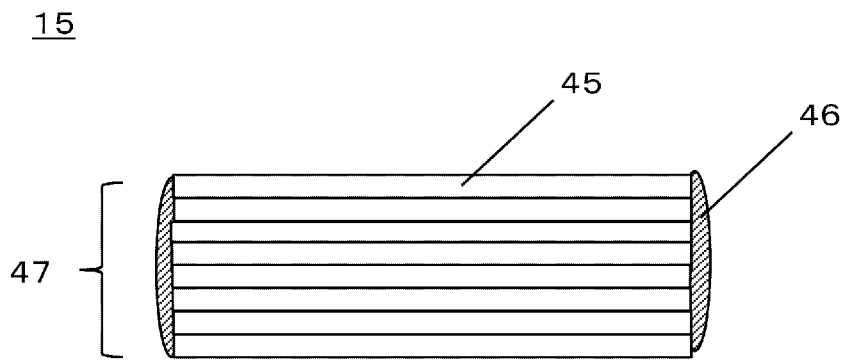
FIG. 10B is a cross sectional view at C-C' of FIG. 10A.

FIGS. 10A and 10B are schematic views representing a method for manufacturing a laminated member 15 of Third Embodiment of the present disclosure. FIG. 10A shows a top view of a laminate of amorphous ribbons 45. FIG. 10B shows a cross sectional view of the laminate of amorphous ribbons 45 at C-C' of FIG. 10A. Anything that is not described is the same as in First and Second Embodiments.

FIGS. 10A and 10B differ from FIGS. 9A and 9B of Second Embodiment in that a work piece 47 is obtained by applying an adhesive 46 to the outer side of the end surfaces of the laminate of amorphous ribbons 45, and by drying the adhesive 46 and fixing the amorphous ribbons 45.

By applying the adhesive 46 to the outer side of the end surfaces of the laminate of amorphous ribbons 45, the amorphous ribbons 45 can be fixed, and the work piece 47 can be obtained without creating a gap between layers of amorphous ribbons 45. Because the layers are not separated by a gap, the amorphous ribbons 45 do not warp, and can be more accurately cut.

This is followed by the punching step described above in (2).

Fourth Embodiment

Figure 11:
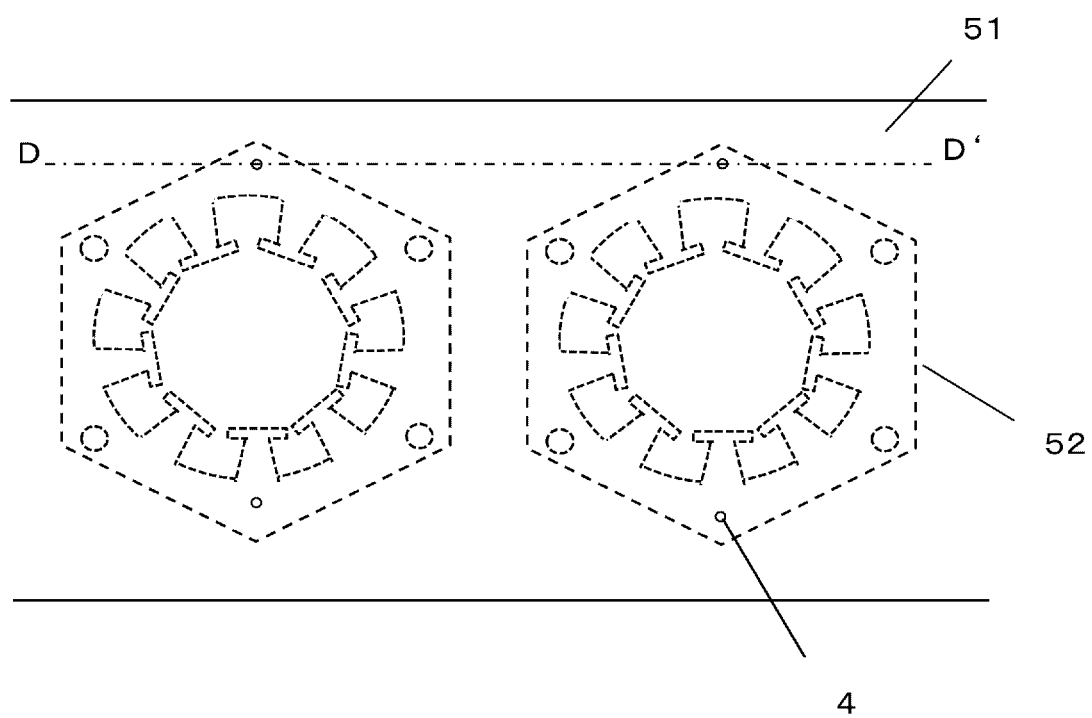
FIG. 11 is a schematic top view representing a method for manufacturing a laminated member according to Fourth Embodiment of the present disclosure.

FIG. 11 is a diagram describing a method for manufacturing a laminated member 15 of Fourth Embodiment of the present disclosure. FIG. 11 is a plan view of a laminate of amorphous ribbons 51. The figure shows a laminate of amorphous ribbons 51, a layout area 52 that becomes a laminated member 15, and positions of holes 4 in which a metal fastening part for fixing the amorphous ribbons 51 in laminate direction is inserted. Anything that is not described is the same as in First to Third Embodiments.

FIG. 11 differs from FIG. 2A of First Embodiment in that the holes 4 used for fixing by the metal fastening part 53 are positioned inside of the layout area 52 where the laminated member 15 is punched. The method used to fix the laminate of amorphous ribbons 7 with the metal fastening part is the same as the method described in First Embodiment with reference to FIG. 1A to FIG. 2B. The holes 4, where fixing is made, are positioned at two locations inside the laminated member 15 to be produced.

The laminated member 15 obtained upon punching is held by being fixed at at least two locations, and can still be treated as a one-piece unit, though the layers are not bonded to one another over the whole surface. Because the laminated member 15 can be treated as a one-piece unit, the laminated member 15 can be efficiently handled at once in each step in shorter time periods. When fixed at one location, the amorphous ribbons may rotate, and cannot be handled as a one-piece unit as easily as when fixing is made at two or more locations. The one-piece unit can improve its toughness when fixed at larger numbers of locations. A disadvantage, however, is that it creates obstacles for the flux path, and impairs the magnetic characteristics. It is therefore necessary to optimize the position and size of the metal fastening part 53.

Figure 12A:
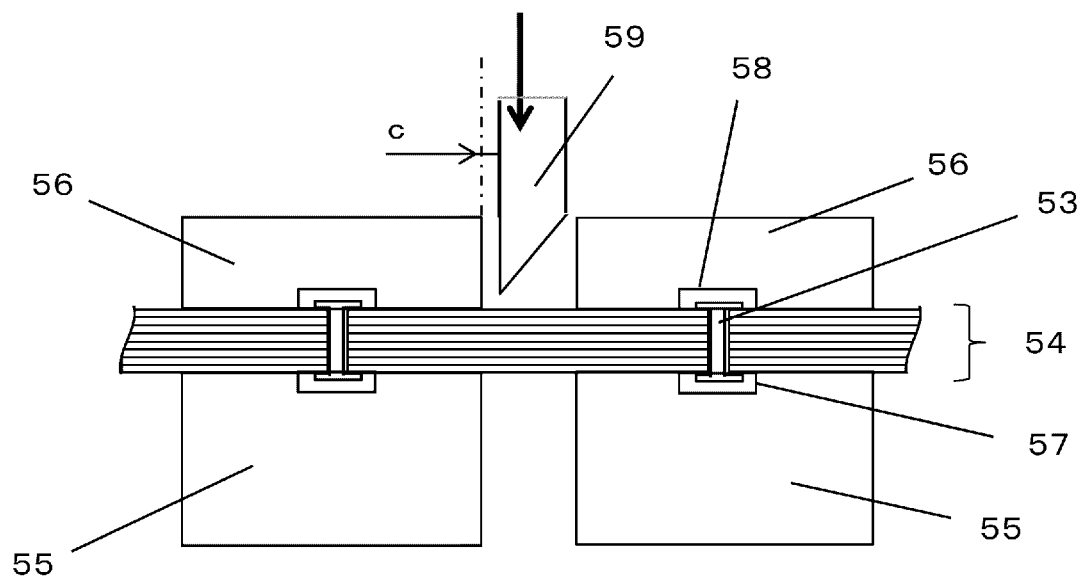
FIG. 12A is a cross sectional view schematically representing a shearing step according to Fourth Embodiment of the present disclosure.
Figure 12B:
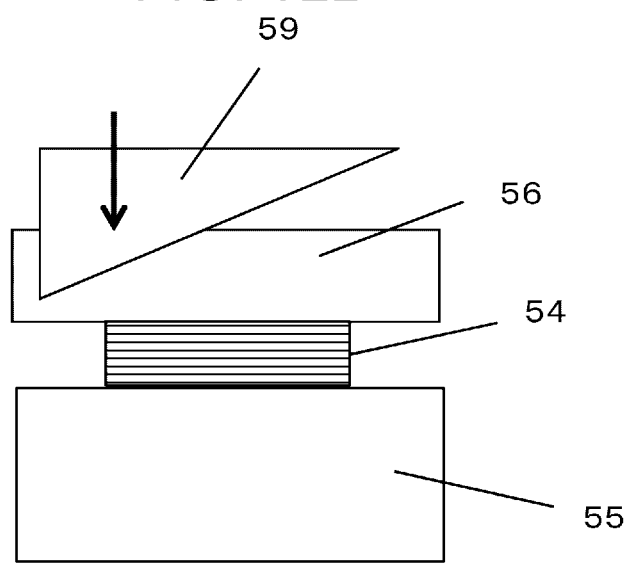
FIG. 12B is a side view of FIG. 12A.

FIG. 12A is a cross sectional view representing the step of shearing the work piece 54 prepared from the laminate of amorphous ribbons 51 shown in FIG. 11, as viewed from a D-D' plane of FIG. 11. FIG. 12B is a side view of FIG. 12A.

The work piece 54 is fixed with a pressure board 56 on a die 55. A metal fastening part 53 is disposed so that the collars of the metal fastening part 53 are in clearance holes 57 and 58. A tool with an inclined shear blade 59 is forced down in a direction of arrow to shear the work piece 54. In this way, the shear force can be greatly reduced. Accordingly, the force that acts to cause sliding of the layers of amorphous ribbons 51 is smaller than in the punching represented in FIGS. 3A and 3B in First Embodiment. This enables the work piece 54 to be cut even with a small clearance c of 2 μm or less.

Figure 13A:
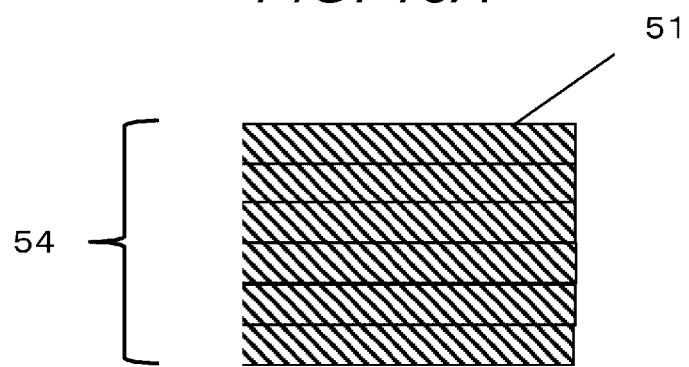
FIG. 13A is a schematic cross sectional view in the vicinity of a cut surface of a work piece according to Fourth Embodiment of the present disclosure.
Figure 13B:
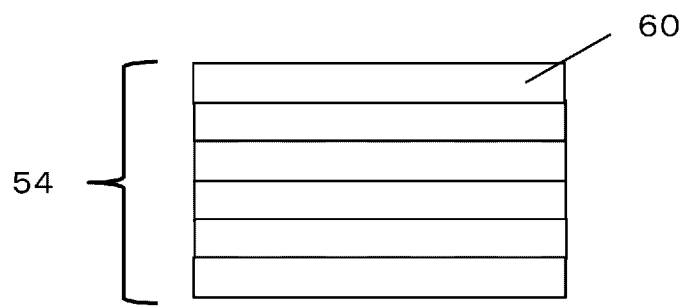
FIG. 13B is an elevational view of FIG. 13A.
Figure 14:
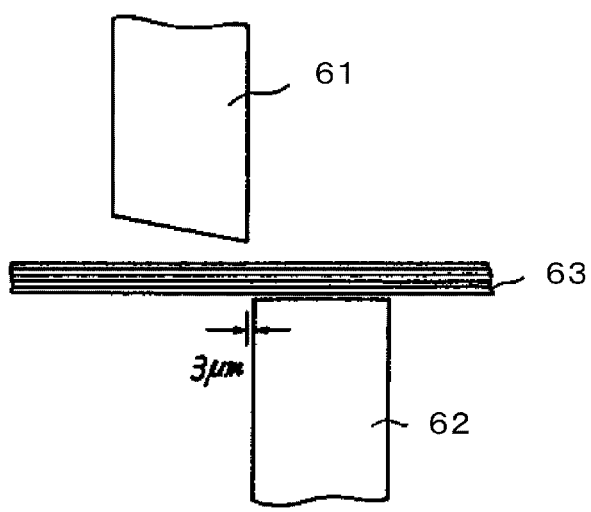
FIG. 14 is a side view schematically representing a method for manufacturing a laminated member of the related art described in JP-A-H03-79215.
Figure 15:
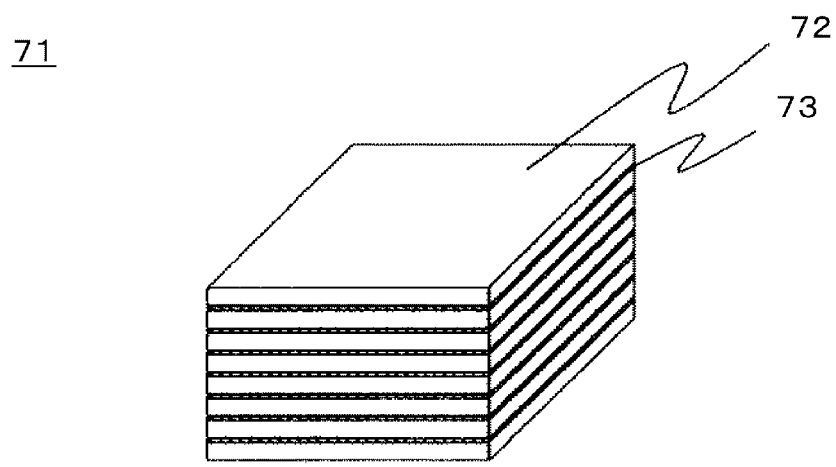
FIG. 15 a perspective view schematically representing a method for manufacturing a laminated body of the related art described in JP-A-2008-213410.

FIG. 13A is a schematic cross sectional view near the cut surface of the work piece 54. FIG. 13B is an elevational view of FIG. 13A. Because the work piece 54 is shear-cut with the shear blade 59, the irregularities at the cut end surface shown in FIG. 13A are smaller than the clearance c (2 μm or less), and the cut surface has more accurate dimensional accuracy than that achievable by the punching represented in FIG. 5A of First Embodiment.

In the elevational view of FIG. 13B, the proportion of shear surface 60 is 75% or more, preferably 80% or more. Because the cut surface has desirable dimensional accuracy, a motor using the product can have a small gap from a rotor 32, and can stably operate with improved efficiency.

Final Note

First to Fourth Embodiments may be combined.

INDUSTRIAL APPLICABILITY

The laminated member, the laminated body, and the methods of manufacture thereof according to the embodiments of the present disclosure are applicable not only to motors but to electronic components that use magnetism, such as transformers.

REFERENCE SIGNS LIST

1 AMORPHOUS RIBBON GROUP
2 RIVETING MATERIAL
3 PRESSING MECHANISM
4 HOLE
5 COMPRESSION MECHANISM
6 METAL FASTENING PART
7 AMORPHOUS RIBBON
8 LAYOUT AREA
9 WORK PIECE
10 DIE
11 PRESSURE BOARD
12 PUNCH
13 CLEARANCE HOLE
14 CLEARANCE HOLE
15 LAMINATED MEMBER
16 BOLT FASTENER HOLE
17 UPPERMOST LAYER OF AMORPHOUS RIBBON
21 ROLLOVER
22 SHEAR SURFACE
23 FRACTURE SURFACE
24 BURR
25 LAMINATED BODY
26 BOLT
27 SPRING WASHER
28 WASHER
29 NUT
30 METAL TABLE
31 COIL
32 ROTOR
41 AMORPHOUS RIBBON
42 LAYOUT AREA
43 ADHESIVE
44 WORK PIECE
45 AMORPHOUS RIBBON
46 ADHESIVE
47 WORK PIECE
51 AMORPHOUS RIBBON
52 LAYOUT AREA
53 METAL FASTENING PART
54 WORK PIECE
55 DIE
56 PRESSURE BOARD
57 CLEARANCE HOLE
58 CLEARANCE HOLE
59 SHEAR BLADE
60 SHEAR SURFACE
61 UPPER BLADE
62 LOWER BLADE
63 AMORPHOUS RIBBON
71 LAMINATED BODY
72 SOFT MAGNETIC METAL RIBBON
73 THERMOSETTING RESIN
a,b,c CLEARANCE

What is claimed is:

1. A laminated member comprising a laminate of a plurality of alloy ribbons, wherein:
   each of the plurality of alloy ribbons has a thickness of 10 μm to 60 μm,
   the laminate member has a side surface with a fracture surface,
   the side surface with the fracture surface includes a shear surface, and
   a percentage of the shear surface in the side surface is 75% or more.

2. The laminated member according to claim 1, wherein the shear surface has a shape with a burnish and a vertical streak, and the fracture surface is of a shape that occurs after material is torn off.

3. The laminated member according to claim 1, wherein a ratio of the area proportion of the shear surface and the area proportion of the fracture surface in the side surface is different for each of the plurality of alloy ribbons.

4. The laminated member according to claim 1, wherein the side surface of only the top one of the plurality of ribbons further comprises a rollover surface.

5. The laminated member according to claim 1, wherein:
   at least some of the plurality of alloy ribbons in the laminate are bonded to each other partially by an oxide film on side surfaces.

6. The laminated member according to claim 1, wherein a lateral height of a largest protruding portion from the side surface measured from the side surface of a top one of the plurality of alloy ribbons is at most 9 μm.

7. The laminated member according to claim 1, wherein:
   a side surface of the laminate has a colored oxide that is visible by a human eye.

8. The laminated member according to claim 1, wherein the plurality of alloy ribbons is fixed at at least two locations within a plane.

9. A laminated body comprising a plurality of laminated members that are laminated, each of the plurality of laminated members being the laminated member of claim 1.

10. The laminated body according to claim 9, which has a side surface having periodically occurring irregularities in a laminate direction of the plurality of laminated members.

11. A motor comprising a core using the laminated body of claim 9.

12. The laminated member according to claim 1, wherein an area proportion of the shear surface within the side surface decreases from a top one of the plurality of ribbons to a bottom one of the plurality of ribbons.

13. The laminated member according to claim 1, wherein an area proportion of the fracture surface increases from the top one of the plurality of ribbons to the bottom one of the plurality of ribbons.

14. The laminated member according to claim 1, wherein the plurality of alloy ribbons comprises nanocrystals having a grain size less than a micrometer.

15. A laminated member comprising a laminate of a plurality of alloy ribbons, wherein:

- each of the plurality of alloy ribbons has a side surface comprising a shear surface, a fracture surface and a burr,
- an area proportion of the shear surface within the side surface decreases from a top one of the plurality of ribbons to a bottom one of the plurality of ribbons,
- an area proportion of the fracture surface increases from the top one of the plurality of ribbons to the bottom one of the plurality of ribbons,
- in a side face of the laminated member, a total area of the shear surface of the plurality of alloy ribbons is 75% or more of a total area of the side face, and
- the plurality of alloy ribbons comprises nanocrystals having a grain size less than a micrometer.

16. The laminated member according to claim 15, wherein each of the plurality of alloy ribbons has a thickness of 10 μm to 60 μm.

* * * * *